(12) United States Patent
Long et al.

(10) Patent No.: US 7,240,378 B2
(45) Date of Patent: Jul. 10, 2007

(54) FLANGE VALVE

(76) Inventors: Michael Anthony Long, 1200 S. Hoover, Apt. 416, Los Angeles, CA (US) 90006; Jonatan Cvetko, 26332 Belle Porte Ave., Harbor City, CA (US) 90710

( * ) Notice: Subject to any disclaimer, the term of this patent is extended or adjusted under 35 U.S.C. 154(b) by 353 days.

(21) Appl. No.: 10/847,722

(22) Filed: May 18, 2004

(65) Prior Publication Data

US 2005/0060795 A1    Mar. 24, 2005

Related U.S. Application Data

(60) Provisional application No. 60/505,612, filed on Sep. 22, 2003.

(51) Int. Cl.
*E03D 11/14* (2006.01)
(52) U.S. Cl. .............. 4/252.1; 137/527; 137/527.6
(58) Field of Classification Search ...... 4/252.1–256.1, 4/661; 137/527, 527.6
See application file for complete search history.

(56) References Cited

U.S. PATENT DOCUMENTS

| | | | | |
|---|---|---|---|---|
| 272,270 A | * | 2/1883 | Larrabee | ............... 210/131 |
| 3,047,013 A | * | 7/1962 | Baumbach | ............... 137/849 |
| 3,118,469 A | * | 1/1964 | Schliesser | ............. 137/527.8 |
| 4,127,142 A | * | 11/1978 | Snider | ............... 137/68.15 |
| 4,813,481 A | * | 3/1989 | Sproul et al. | ............. 166/51 |
| 4,935,129 A | * | 6/1990 | Wang | ................. 210/131 |
| 5,117,862 A | * | 6/1992 | Molligan | ............. 137/527.8 |

* cited by examiner

*Primary Examiner*—Charles E. Phillips
(74) *Attorney, Agent, or Firm*—David A. Belasco; Belasco Jacobs & Townsley, LLP

(57) ABSTRACT

A flange valve to deter entry of rodents and pests, insertable on existing devices, comprising a unidirectional swinging door attached on an inner wall of a frame, the door and the inner wall of the frame having a clearance between them of a dimension not allowing entry of rodents and pests. The design of the frame is catered to the desire of the user and may be a laterally protruding ring having a central circular opening and openings along the edges for the insertion of bolts or screws; a laterally protruding ring on one peripheral edge of an open cylindrical body; a cap having a flat top with a central circular opening and openings for the insertion of bolts and screws; a conduit; or a wax free toilet bowl gasket, a toilet flange or a wax ring used in the installation of toilet bowls.

9 Claims, 13 Drawing Sheets

FLANGE VALVE

This application claims the benefit of U.S. Provisional Patent Application Ser. No. 60/505,612 filed on Sep. 22, 2003.

BACKGROUND

This invention relates to a device, a flange valve, that prevents entry of rodents and other crawling harmful animals and bugs, hereinafter referred to as pests, into households and establishments from conduits outside or underneath the house or establishment especially those connecting to a toilet bowl where entry is more accessible because of the diameter of the conduit or piping. The flange valve of the claimed invention is adoptable to any size of conduit.

A significant number of rodents and pests thrive underground and transfer from one place to another through the plumbing that extends to the sewage system or connects one location to another. Points of entry into a household can be through the toilet bowl, urinals, showers, bath tub or sinks. These rodents and pests may carry diseases or physically harm furnitures and equipment after access.

It is therefore an object of this invention to provide a device that would prevent entry of rodents and pests through the toilet bowl, tubs and sinks.

It is therefore another object of this invention to provide a device that is unidirectional, allowing the exit of rodents, wastes and pests but not entry through the same device.

It is therefore a further object of this invention to provide deterring components on the device that would discourage or physically harm a rodent or pest attempting entry through the device.

It is therefore an even further object of this invention to provide a device that is easy to install and yet economically priced to encourage homeowners and owners of apartments and commercial buildings to install this device.

SUMMARY OF THE INVENTION

This invention relates to a device, a flange valve, that deter entry of rodents and pests into a household or establishment comprising a laterally protruding ring on a peripheral edge of an inner centrally located circular opening and a unidirectional swinging door attached to an inner wall of the inner circular opening of the flange valve. To facilitate insertion, the flange valve preferably comprises a flange valve crown having a laterally protruding ring on one peripheral edge of an open cylindrical body and a unidirectional swinging door attached to an inner wall of the cylindrical body. The dimensions of the clearance between the peripheral edges of the door and the inner circular opening or the inner wall of the cylindrical body should not allow entry of the rodents and pests. The protruding ring of the flange valve, allows the flange valve to insert between a toilet flange and a wax ring, if used; to insert into the conduits or into other flanges; and to close any gap between the flange valve and other flanges or between the outer wall of the cylindrical body of the flange valve and the inner wall of the conduits or other flanges. To ensure a good seal between the flange valve and the other devices, gaskets may be placed between them. The flange valve can be installed with existing flanges and conduits without modifying the latter. However, the unidirectional swinging door, although described as a component of a flange valve, may also directly attach to the inner wall of any conduit connecting one location to another. The door is made unidirectional by a door stopper which allows the door to swing at one direction but prevents the door from swinging at the opposite direction. At the bottom surface of the door, one can place spikes, ridges, lines and the like that would discourage the rodents or pests from touching the door.

DETAILED DESCRIPTION OF THE INVENTION

Figure 1:
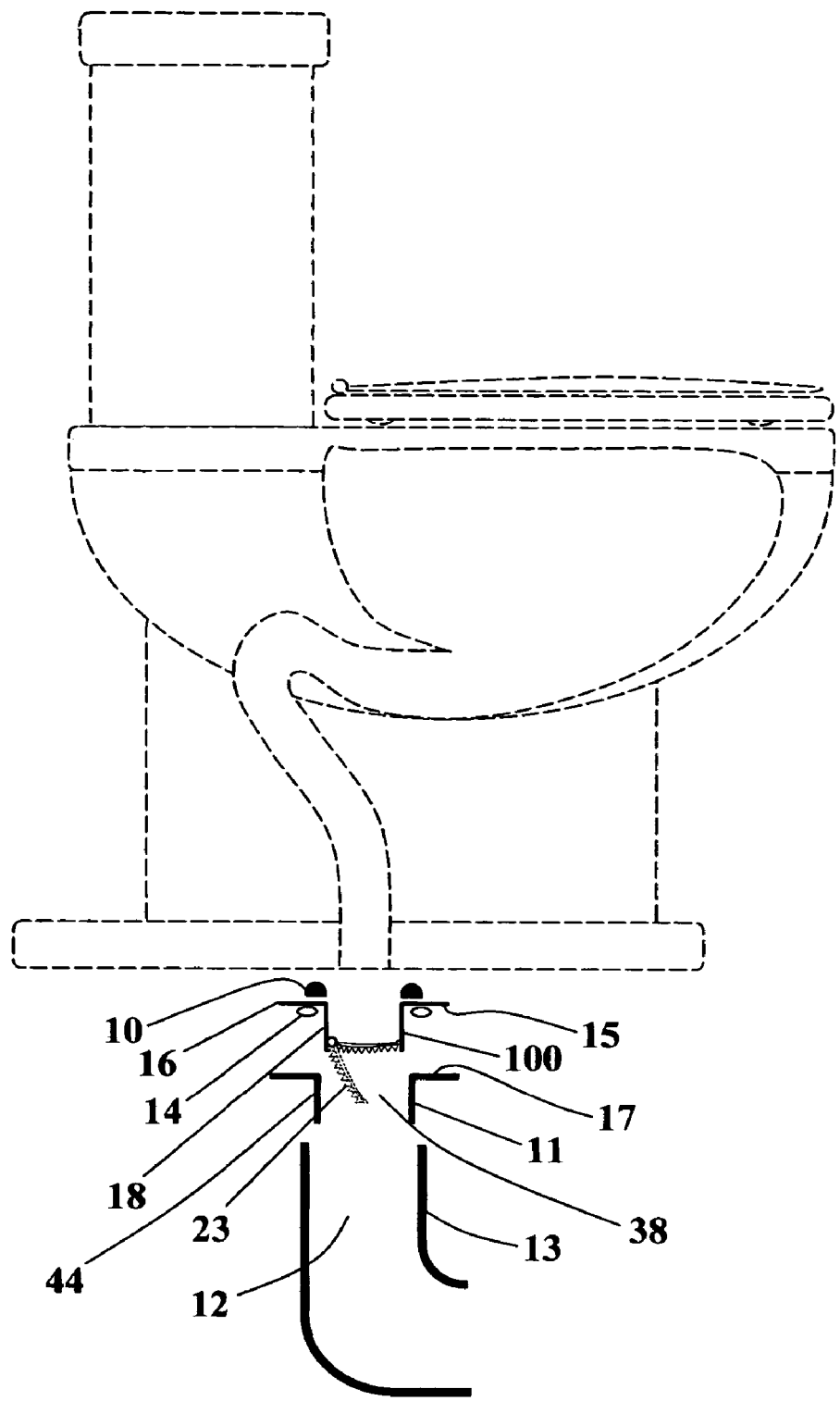
FIG. 1 is an exploded view showing the position of the flange valve relative to the wax ring, a four inch flange and pipe.
Figure 9:
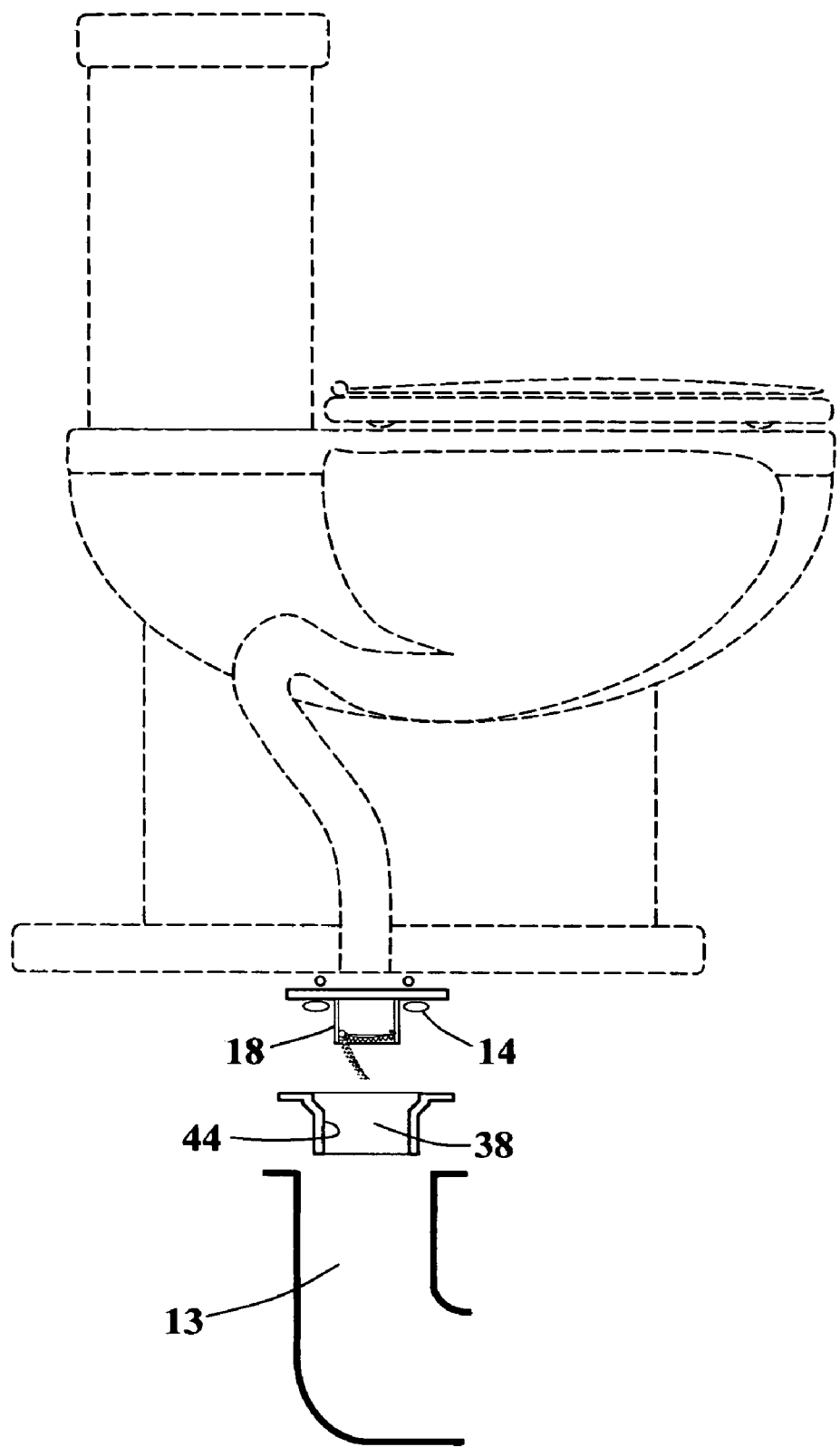
FIG. 9 is an exploded view showing the position of the flange valve relative to the wax ring, a three inch flange and pipe.

The flange valve 100 is a device that can be installed between the present wax ring, also known as wax toilet bowl gasket 10 and the toilet flange 11 of a floor toilet bowl or inserted within a wax free toilet installation bowl gasket. Currently, the wax ring 10 is placed on top of the toilet flange 11. The flange valve 100 inserts between or is inserted into the toilet flange 11 which in turn inserts into a conduit, herein shown as pipe 13. The flange valve 100 and the toilet flange 11 are designed to adopt or fit into the inner compartment 12 of a preferably but not necessarily, vertically disposed pipe 13. FIGS. 1 and 9 show the position or location of the flange valve 100 relative to the wax ring 10 and flange 11. The wax ring, flange valve and flange are installed at the bottom exit hole of a toilet bowl as shown in FIGS. 1 and 9. This same concept and teaching as herein illustrated on toilet bowls, can be applied to the installation of the flange valve 100 with other types of conduits which may or may not have intermediary flanges for installation. Substitutes or improvements of the present toilet flanges such as the Wax-Free™ toilet installation bowl gasket sold by Fluidmaster Inc., San Juan Capistrano, Calif. is illustrated on FIGS. 10 and 11. The flange valve 100 is designed to adapt to the different kinds, shapes, and sizes of flanges, and conduits in general. The flange valve can be disk shaped having a laterally protruding ring on a peripheral edge of an inner central circular opening and a unidirectional swinging door attached to an inner wall of the inner circular opening or it can fit over a flange such as the toilet flange or any conduit, in which case, it is designed like a cap having a flat top with a central circular opening located at the same position as the opening on the toilet flange or the conduit. These designs will require the laterally protruding ring or the flat top of the flange valve to have openings that match the openings on the toilet flange where the screws or bolts are introduced during the installation at the exit hole of the toilet bowl. For ease of installation and flexibility when used with flanges in general, without concern on the location and shape of the openings for the bolts or screws, the flange valve 100 preferably comprises as shown in FIGS. 2-5, a crown having a laterally protruding ring 16 on one peripheral edge of an open vertical cylindrical body 18 extending downwards from the ring which can insert inside the conduit or the flange. In the above designs of the flange valve, a unidirectional swinging door 23 attaches to an inner wall of the central circular opening of a laterally protruding ring, or the central circular opening on the flat top cap, or the cylindrical body. Conduit as used herein includes pipes and other devices that allow the passage or transport of water and solid materials from one location to another. It is important, during the assembly of the flange valve between the wax ring and the flange that neither the wax ring 10 nor the flange 11 interferes with the opening and closing of the door 23 of the flange valve 100. For extra seal, a gasket 14 may be placed between the bottom surface 15 of the laterally protruding ring of the flange valve and the top surface 17 of the flange 11. This gasket can be made from natural or synthetic rubber, plastic or derivatives of these.

Figure 2:
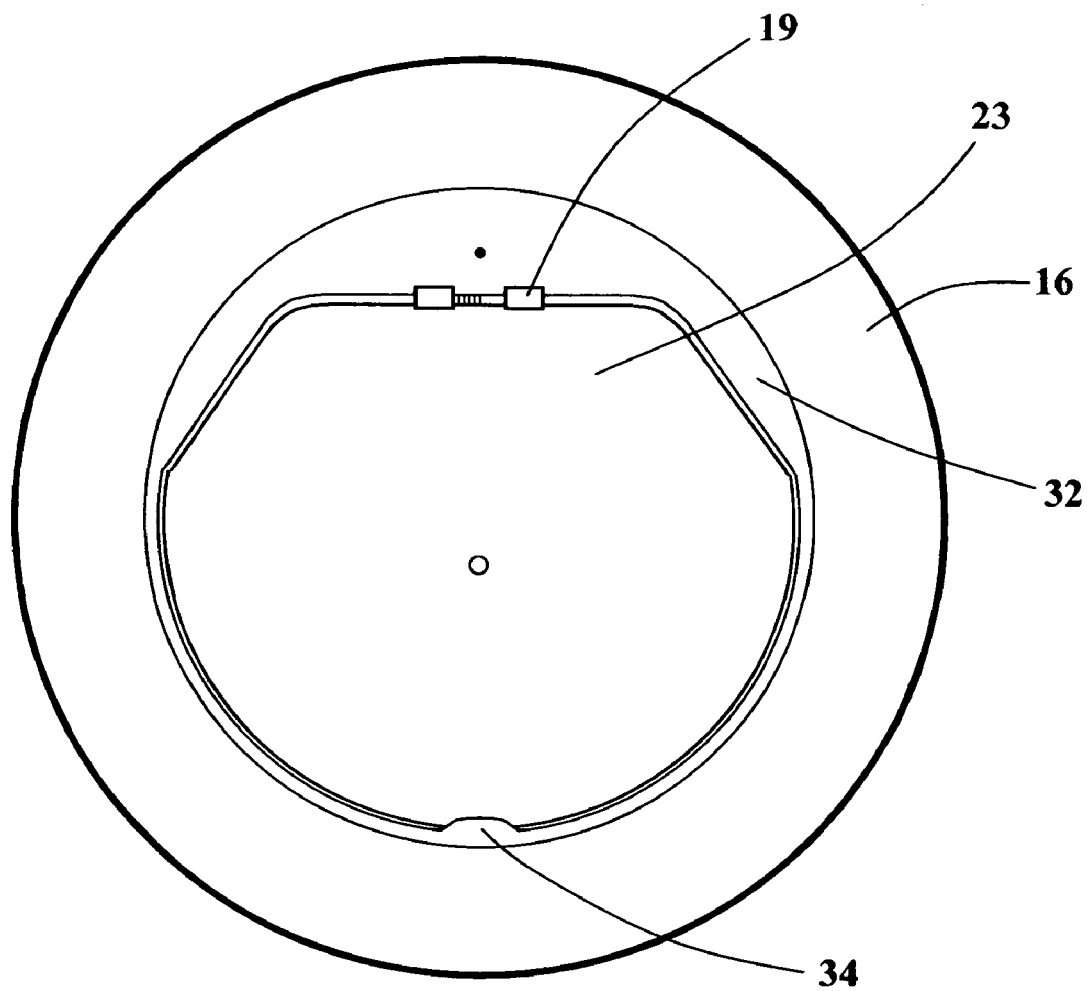
FIG. 2 is a top plan view of the flange valve with the door closed.
Figure 2A:
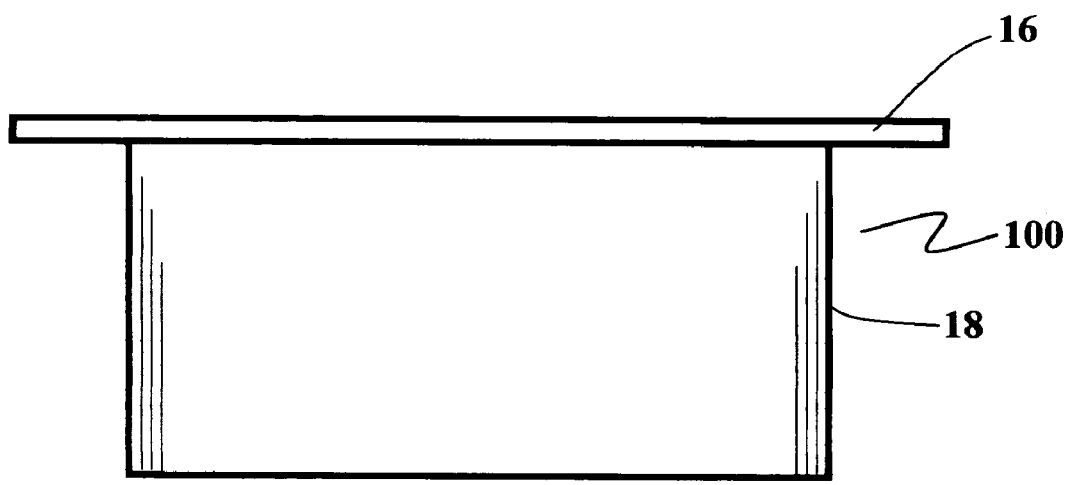
FIG. 2A is a side view of the flange valve with the door closed.
Figure 3:
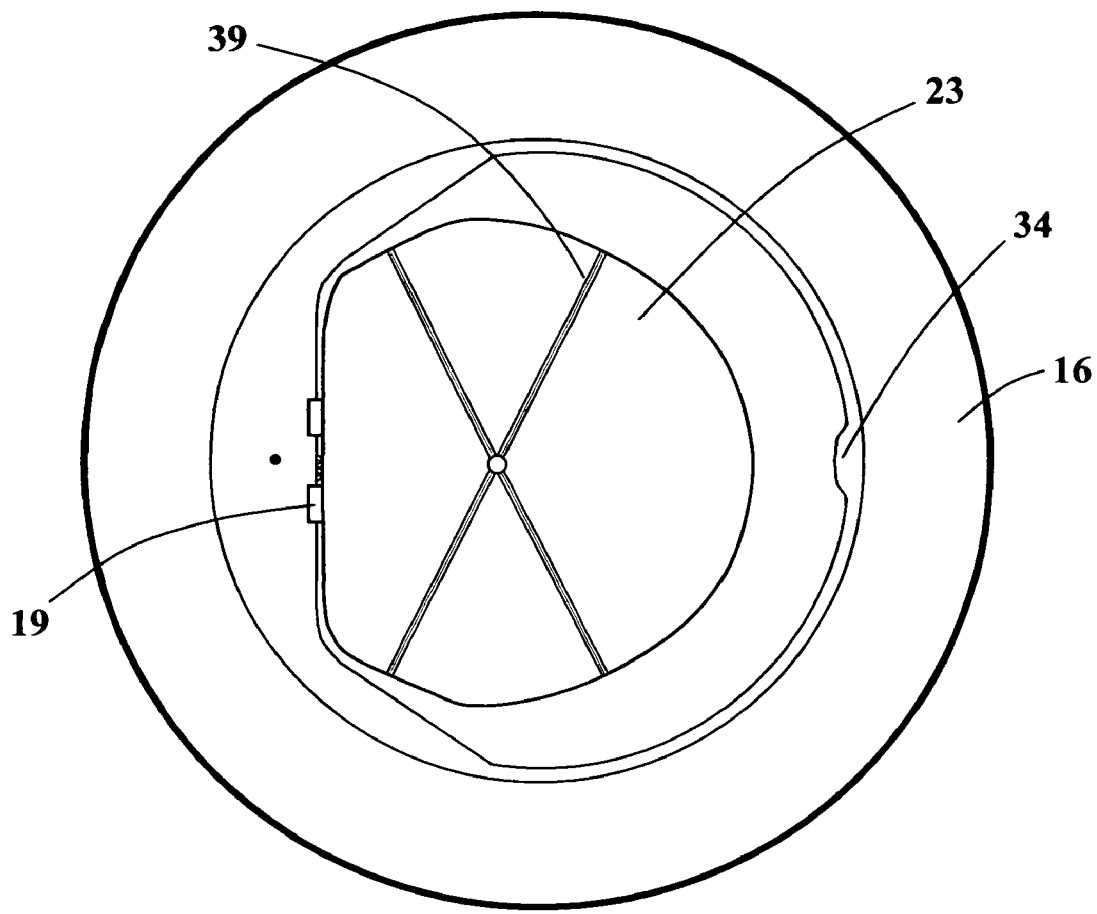
FIG. 3 is a top plan view of the flange valve with the door open.
Figure 7:
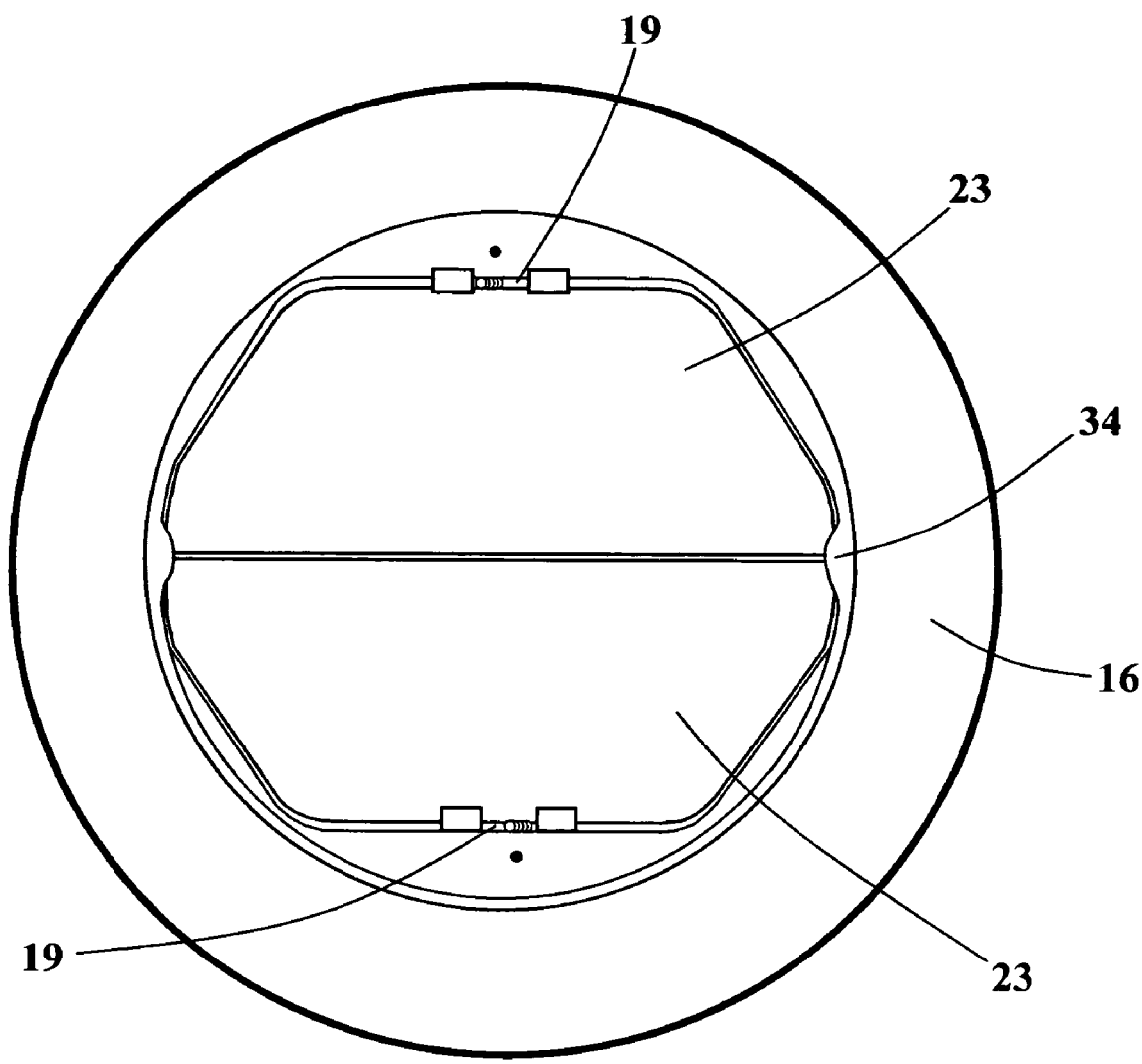
FIG. 7 is a top view of a flange valve with a two panel door opening at the middle.
Figure 8:
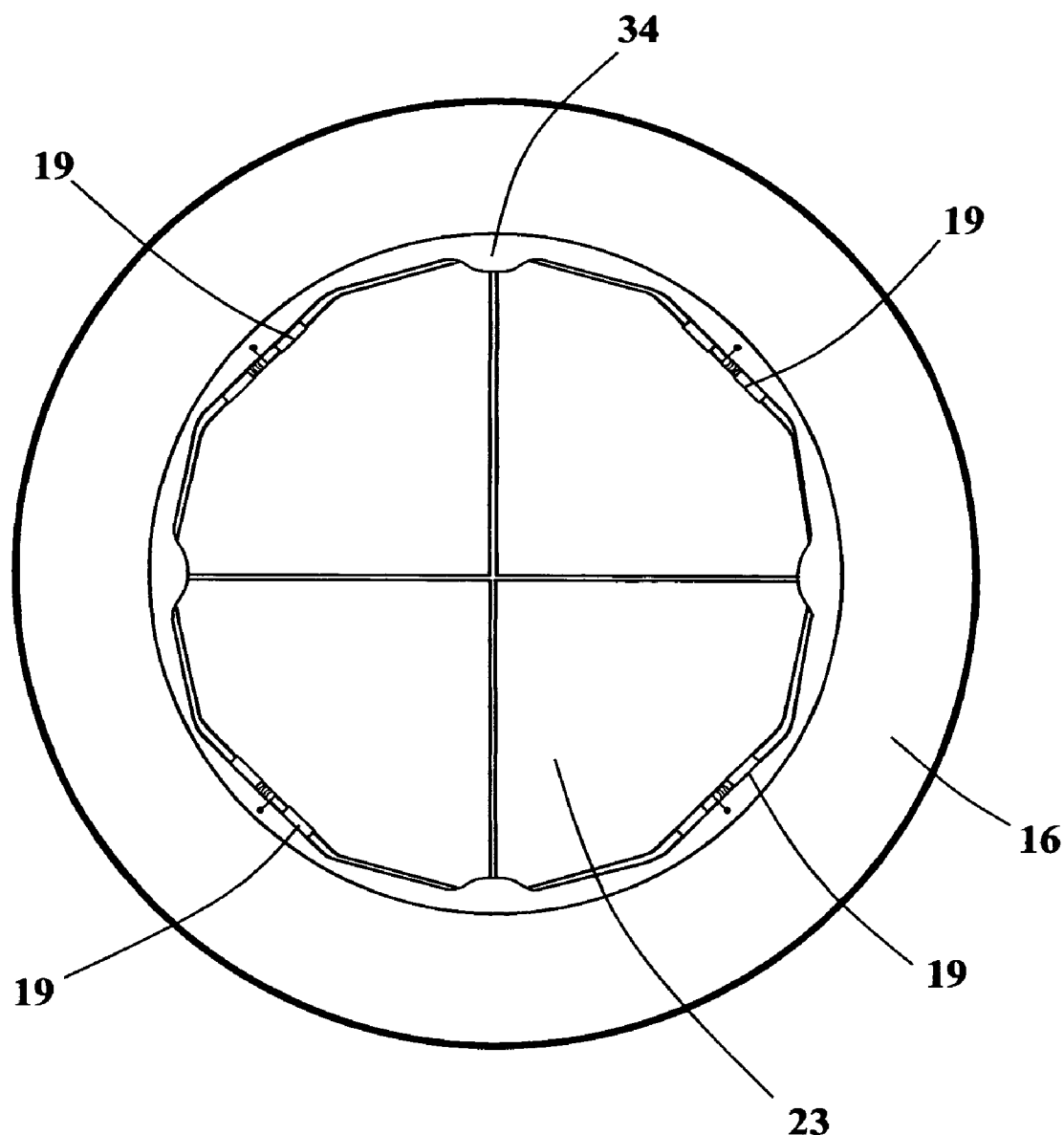
FIG. 8 is a top view of a flange valve with a four panel door opening at the middle.

The following detailed description will use the preferred flange valve, one having a cylindrical body to illustrate its mechanism and usage with existing toilet flanges connecting to an exit pipe 13 since the other designs, disk or cap, simply differs by using bolts or screws for attachment to the toilet flange and other devices but employ the same technology. The flange valve cylindrical body 18 is contoured to either snugly or loosely fit into the inner diameter of flange 11 or pipe 13. On a loosely fit flange valve 100, it is preferable but not necessary to allow a reasonable amount of overlap between the cylindrical body 18 of the flange valve crown and the pipe 13 or the flange 11. Attaching by way of a hinge 19 at one side 20 proximal to the bottom lip 21 of the inner wall 22 of the vertical cylindrical body 18, is a door 23. The location of attachment at the inner wall 22 is at the discretion of the manufacturer. It is preferable but not necessary to place the attachment at a location wherein the bottom surface 24 of the door 23 will not flush coterminally with the bottom lip 21 of the vertical cylindrical body 18 of the flange valve crown. The bottom surface 24 is preferably recessed inwards from the bottom lip of the cylindrical body to prevent the rodents and pests from hooking or grabbing on the door and opening it from the side facing the exit pipe thereby gaining entry. The door 23 is contoured to the opening of the pipe 13 or flange 11 to allow for maximum opening thereby allowing the maximum amount of waste from the toilet bowl to pass through easily even after the installation of the flange valve. The door is also designed so that in the event that it should come loose or detach from the hinge 19, it is not large enough to be caught at an angle that will lodge on the pipe to cause blockage. To ensure this, stress grooves 39 may be etched on the top surface 36 of the door 23 to facilitate the breakage of the door into pieces upon pounding in case the detached door blocks the pipe. The number of stress grooves 39 is variable, depending on one's preference. In FIG. 3, there are two lines of stress grooves shown. The flange valve is designed such that when the door is closed, the rodents and, pests would not be able to enter from the clearance between the inner wall of the horizontal body, of the central circular opening of the protruding ring, of the central circular opening of the flat top, or the conduit, as applicable, and the peripheral edges of the door as shown in FIGS. 2, 7 and 8.

Figure 4:
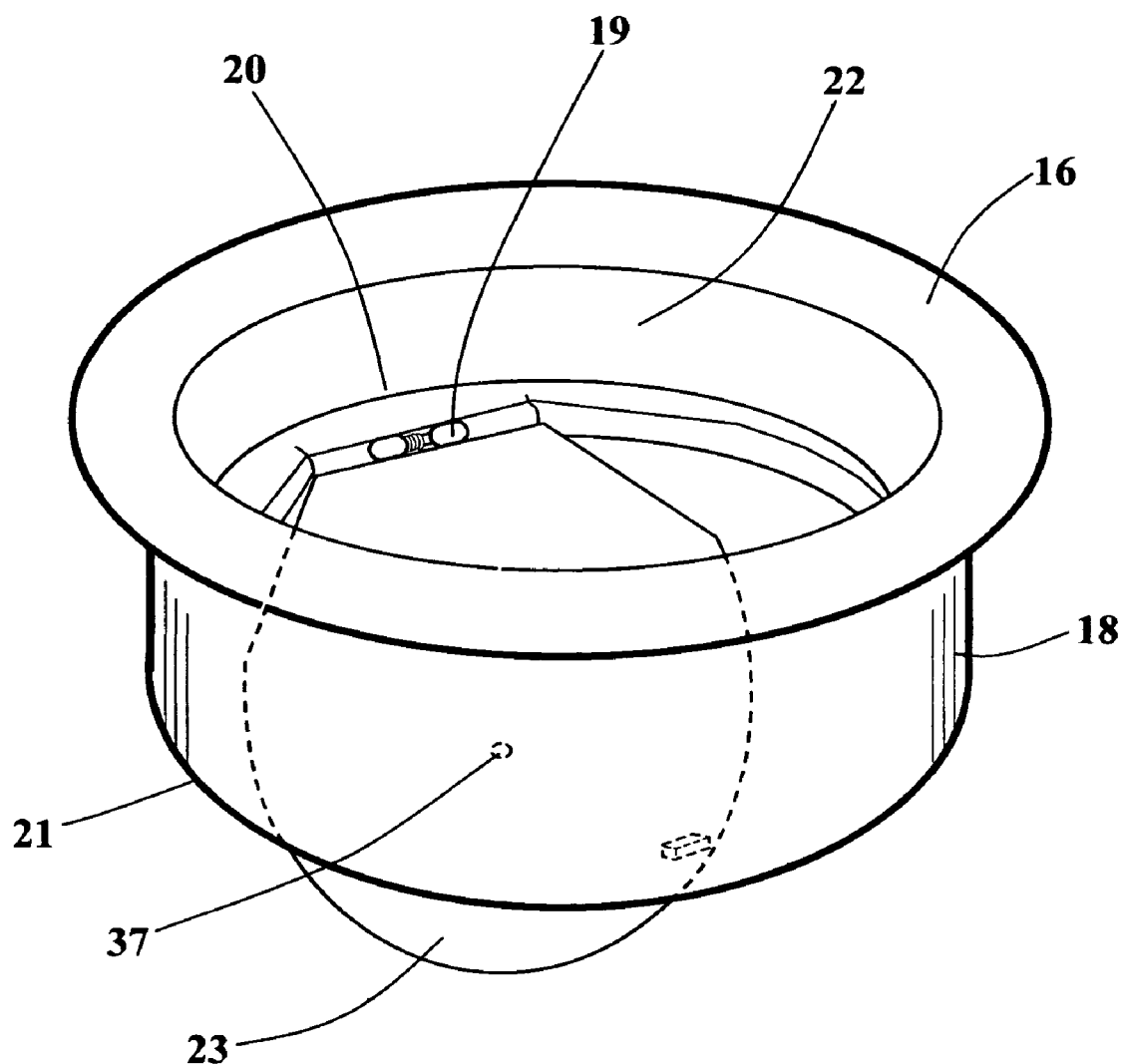
FIG. 4 is a perspective view of the flange valve having a laterally protruding ring on one peripheral edge of an open cylindrical body.
Figure 5:
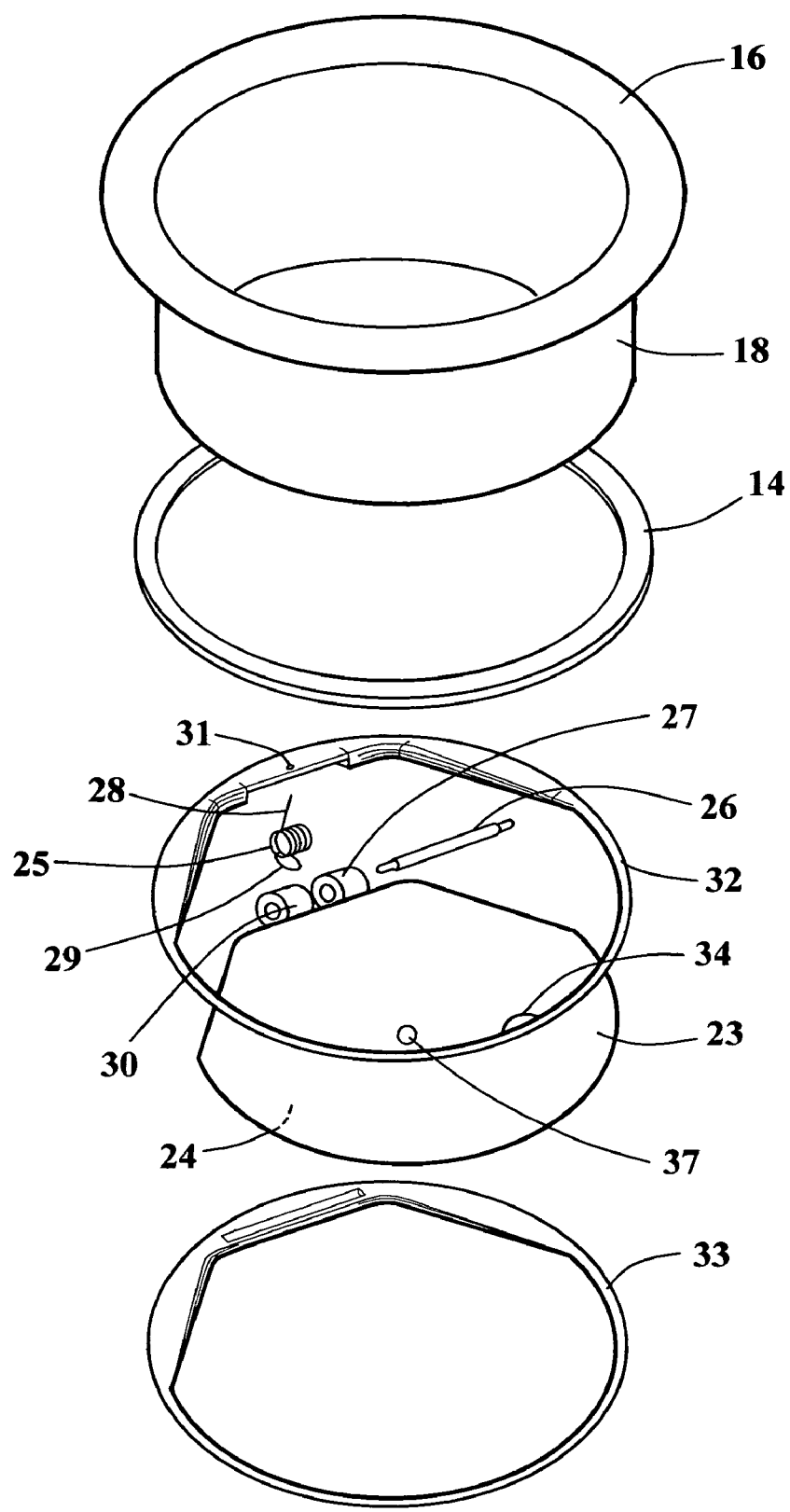
FIG. 5 is an exploded view showing the components of a flange valve.

The hinge 19 is preferably a spring loaded hinge made of a rust proof material or metal alloy such as stainless steel, chromium and the like. The spring 25 enable the door 23 to open when pressure is exerted on it and to close automatically after the pressure is released or removed. When used on toilet bowls, the door of the flange valve is opened by pressure exerted from the flushing of water and waste material from the toilet bowl. In the case of flange valves installed on conduits in general such as plain pipings instead of a toilet bowl, the pressure to open the door can be exerted by the flow of the water and/or waste or by a crawling rodent or pests through the pipe. The stretching of the spring 25 caused by the pressure exerted on the flange valve, opens the door 23. The inherent tendency of the spring to revert to its original unstretched state when the pressure is released or removed, closes the door. This makes a spring loaded hinge ideal for this operation. The spring loaded hinge or other comparable hinges can be designed and installed in several manner as long as it allows the door to swing down to an open position upon application of pressure and to swing back to a closed position when the pressure is released or removed. The components of an example of a spring loaded hinge door assembly is shown in FIG. 5. Using this illustration or example, a spring loaded hinge is assembled as follows: a pin 26 is inserted into a first pin holder 27. After entry of the pin into the first pin holder 27, a spring 25 is inserted on the end of the pin protruding from the first pin holder at an orientation having the pointed end 28 of the spring 25 pointing upwards and the loop 29 of the spring 25 pressing on the bottom surface 24 of the door 23. After insertion of the spring, the pin is inserted into a second pin holder 30. To keep the spring 25 and the pin 26 stationary, the door with the spring loaded hinge is sandwiched between two plates having a central opening coinciding with the door 23 and the pointed end 28 of the spring is inserted into a hole 31 of an upper plate 32 which attaches to a lower plate 33 by means of gluing, snapping and the like. This door assembly is in turn attached to the inner wall 22 of the vertical cylindrical body 18 of the flange valve crown as shown in FIG. 4. The attachment of the door assembly illustrated here can be applied to the other designs of the flange valve.

Figure 3A:
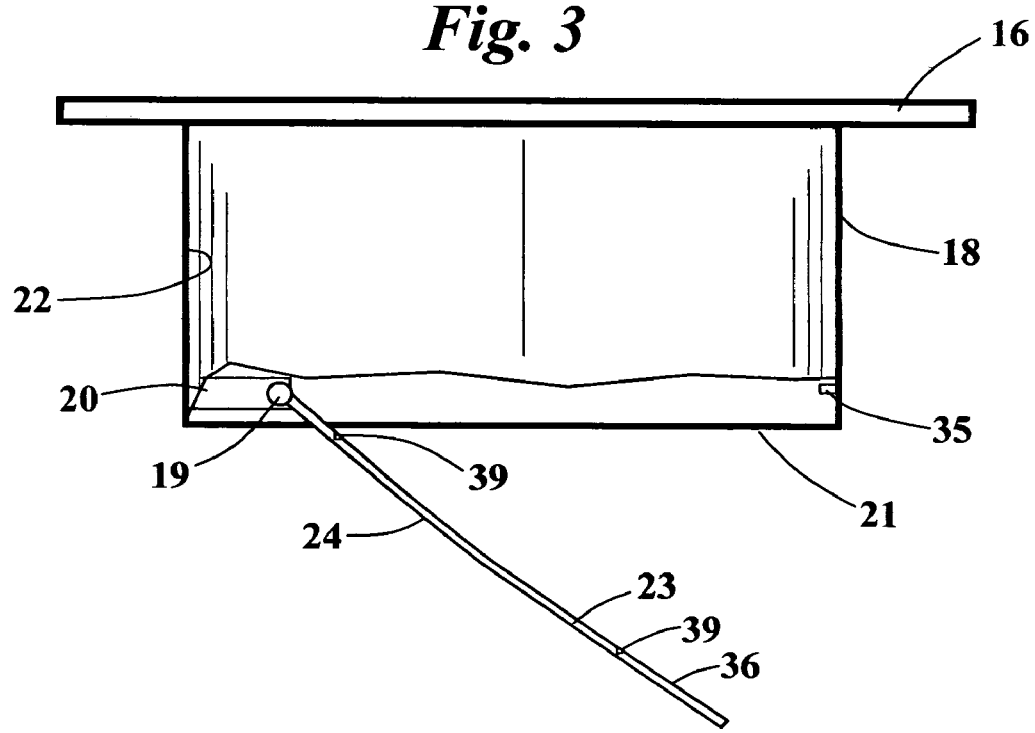
FIG. 3A is a side view of the flange valve with the door open.

The reversion of the spring to its original state, however, may cause the door to swing upwards. Therefore, a door stopper 34 is placed on the flange valve to prevent the upward swing and also prevent the rodents and pests to push the door 23 open and gain entry to a household or establishment. The door stopper 34 makes the door and consequently, the flange valve, unidirectional. The door stopper is installed either at the inner wall 22 of the vertical cylindrical body 18 at a level that will close the door completely as shown in FIG. 3A or it can be installed or molded as a protruding element from the upper plate 32 of the door assembly as shown in FIG. 5, and in the case of the disk or cap shaped flange valve, as an element protruding to the central circular opening from the top surface of the protruding ring or the flat top of the cap. The lower or bottom surface 35 of the door stopper 34 should be flat and should receive and match a flat upper surface 36 of the door 23 leaving as minimum a space, if any, between them. Naturally, if the upper surface 36 is not flat but contoured differently, then the bottom surface 35 of the door stopper 34 should be contoured likewise to match the contour of the upper surface 36 of the door. It is important to keep the spring 25 tight to keep the bottom surface 35 of the door stopper engaged with the upper surface 36 of the door when the door is in a closed position. The door stopper 34 is usually placed opposite the spring or pin holder but other locations are possible and several door stoppers can be installed instead of one. The top surfaces of the door stopper, the door, and the upper plate 32, the latter if used in the door assembly, preferably slope downward towards a central location for a more effective flushing of the solid waste and to prevent solid waste from settling on the top surface of the door or the upper plate. The central location can have a hole 37 for draining the small amount of water or waste left on the upper surface of the door after a flush of the toilet or application of running water through a pipe. There can be more than one hole.

FIG. 4 shows the perspective view of the flange valve 100 having a cylindrical body. The length of the vertical cylindrical body 18 can vary. Generally, the length can be shorter if the flange valve will insert snugly into the toilet flange 11 as shown in FIG. 1. It is, however, recommended that the body 18 extend further into the inner compartment 38 of the toilet flange 11 especially if the flange valve will sit loose inside the compartment 38, that is, the outer diameter of the vertical cylindrical body 18 is smaller than the inner diameter of the compartment 38 of the toilet flange as shown in FIG. 9. Some of the materials that can be used to manufacture the flange valve 100 are polyvinylchloride, ABS (acrylonitrile butadiene styrene), fiber glass, ceramic, stainless steel, and other hard plastic materials in general.

Figure 6:
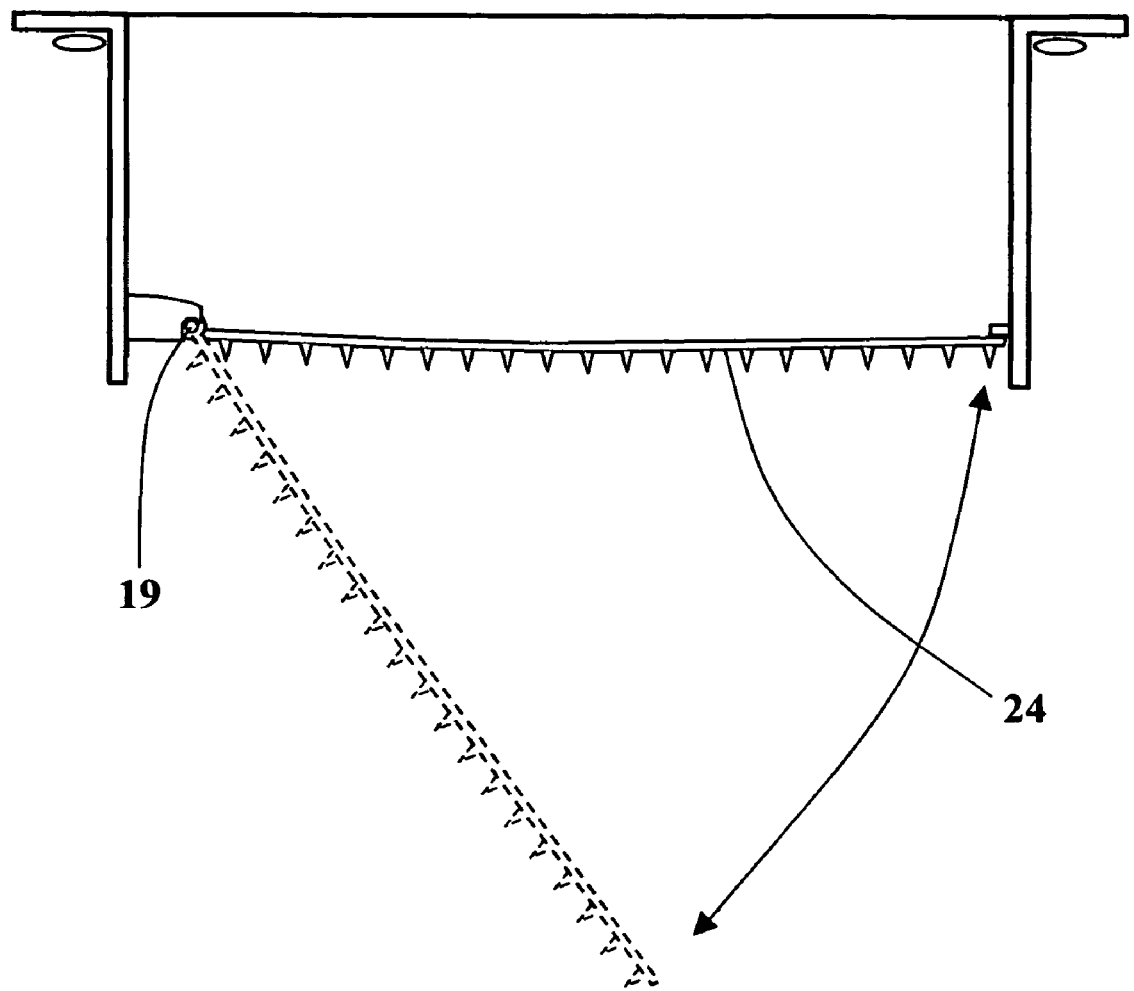
FIG. 6 is a side view of a flange valve door with spikes on the bottom surface of the door.

At the bottom surface 24 of the door, one can put a plurality of restraining elements such as spikes, ridges, lines and the like to discourage or restrain the rodent or pests from touching the door and attempting to escape. FIG. 6 shows spikes protruding from the bottom surface 24 of the door. The number and location of the restraining elements are at the discretion of the manufacturer or user.

FIGS. 7 and 8 show variants on the design of the door and the location of the door stopper 34. The door can be of any size, shape and number as long as there are no gaps or openings around the door or around the flange valve that would allow entry of rodents and pests when the door is closed.

Figure 10:
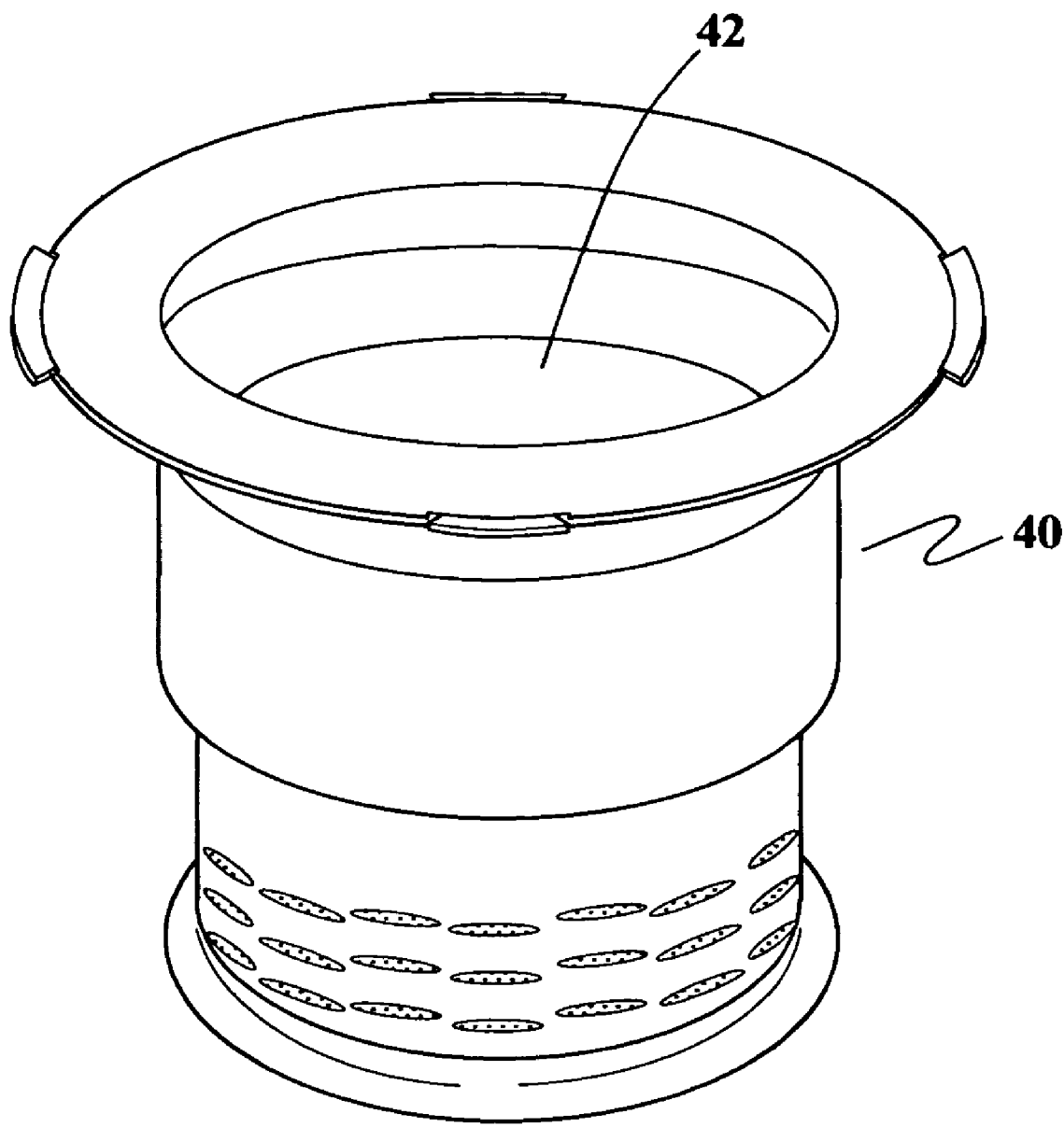
FIG. 10 is a perspective view of a commercially available wax free toilet installation bowl gasket.
Figure 11:
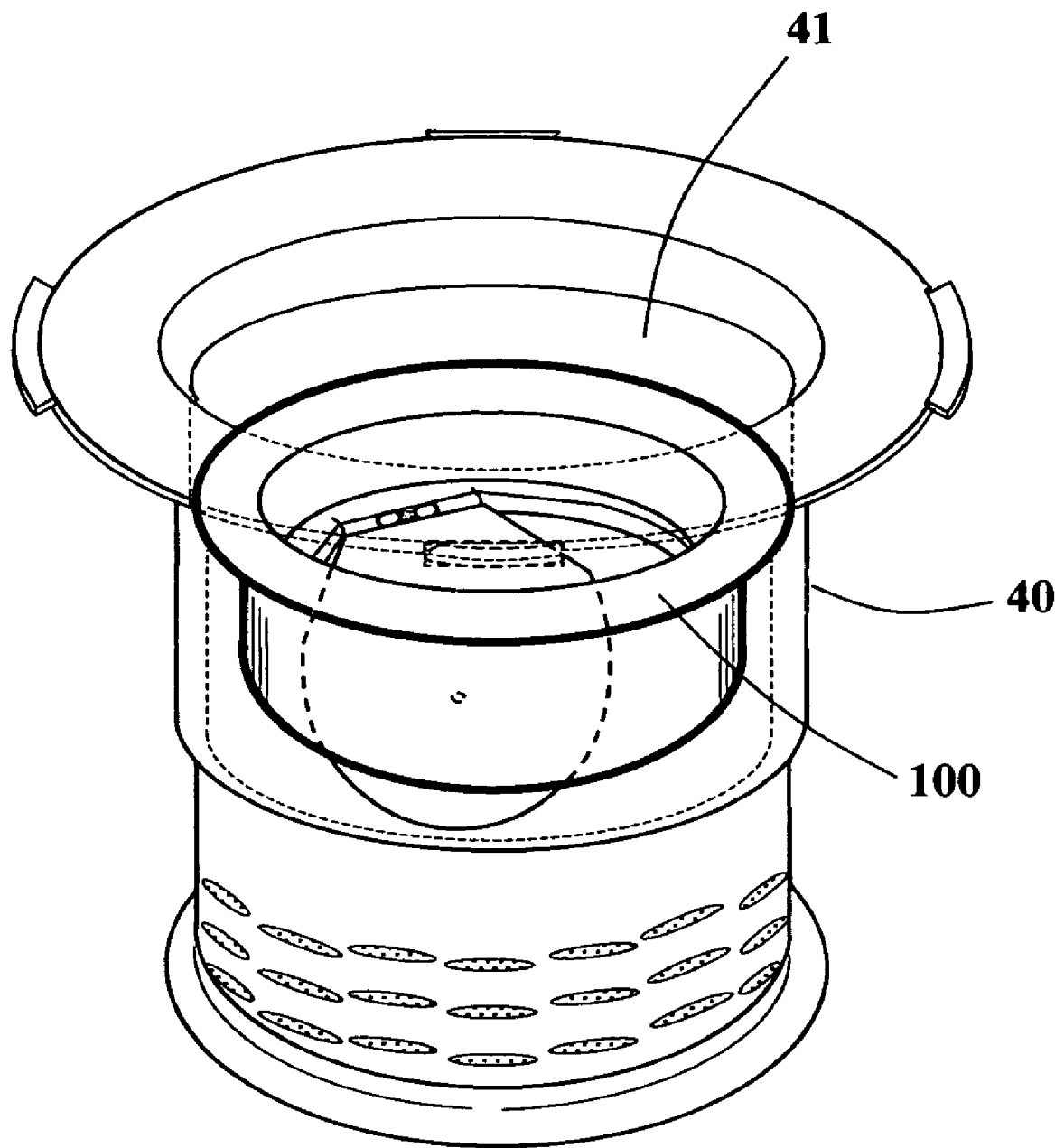
FIG. 11 is a perspective view showing a flange valve inserted inside the wax free toilet installation bowl gasket of FIG. 10.

The flange valve 100 can be easily adapted to fit into other flanges aside from the toilet flanges and wax rings such as the Wax-Free™ toilet installation bowl gasket 40 shown in FIG. 10 which is commercially available from companies like Fluidmaster Inc., San Juan Capistrano, Calif. The claimed device can also be embedded into the wax ring 10 as is or with slight modification. As in the toilet flange 11, the flange valve 100 inserts into the inner compartment 41 of the bowl gasket 40 as shown in FIG. 11. It would be too lengthy and unnecessary to illustrate each and every design of the flange valve and its application or adaptation on the different conduits connecting one location to another since the descriptions and illustrations herein provide enough details and teachings to enable one to apply the type of flange valve to the type of conduit desired.

Figure 12:
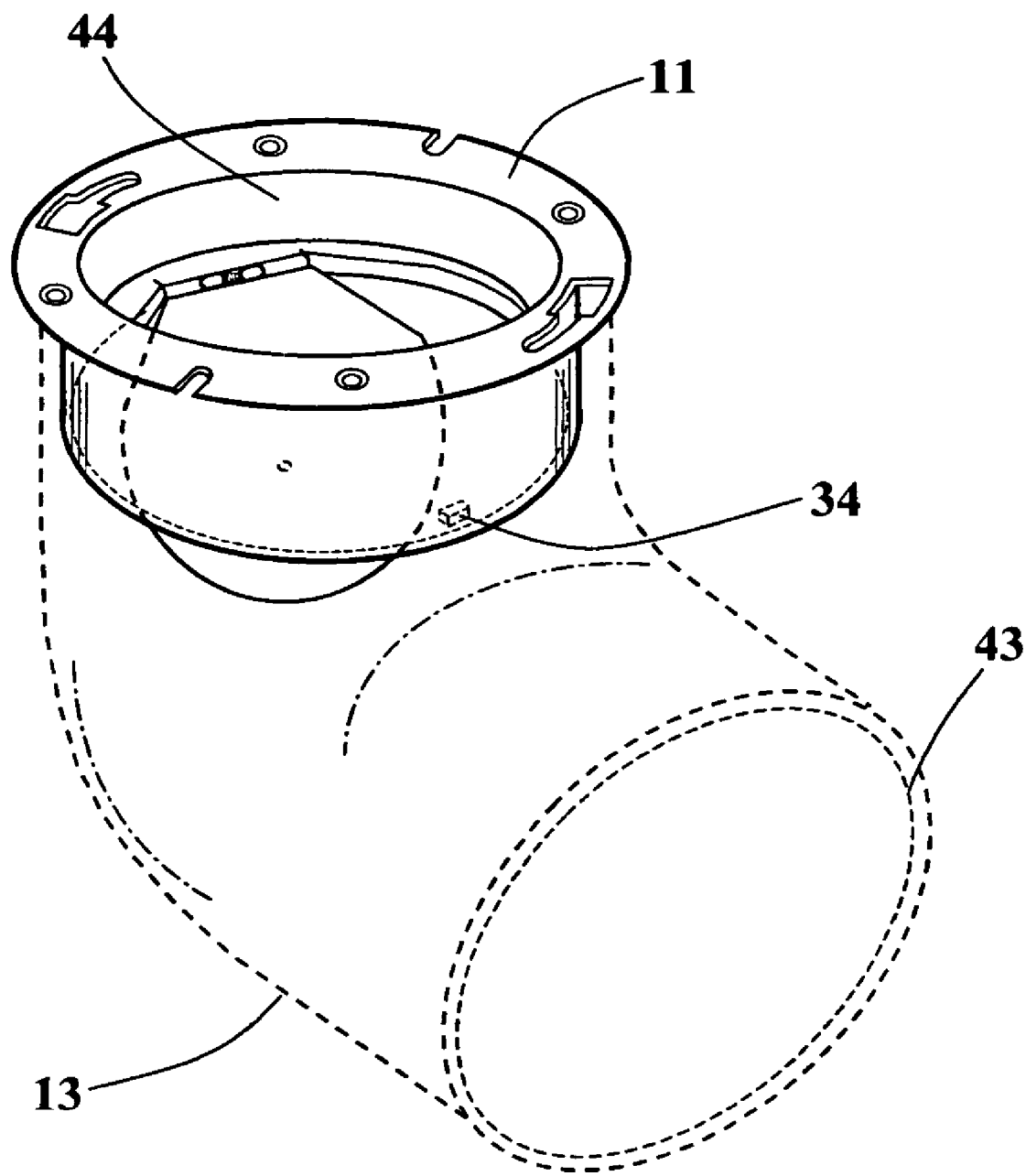
FIG. 12 is a perspective view of a door and door stopper directly attaching to an existing toilet flange.
Figure 13:
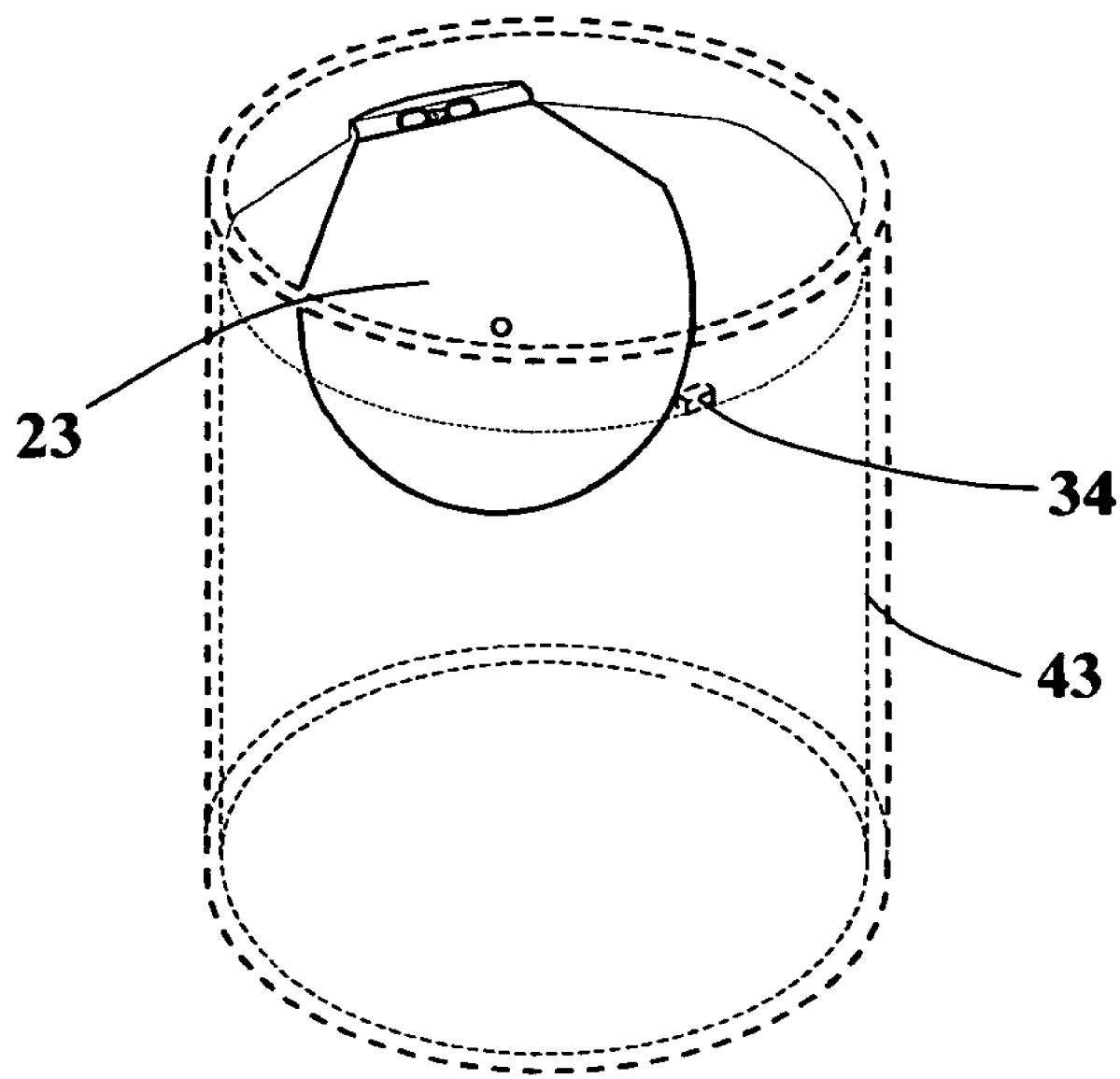
FIG. 13 is a perspective view of a door and door stopper directly attaching to a conduit.

Although the flange valve 100 is shown and described above as a separate insertable device, the door 23 can be directly attached by a hinge to any inner wall of a conduit such as the inner wall 44 of the toilet flange 11, the inner wall 42 of the bowl gasket 40 or the inner wall 43 of any pipe with the door stopper 34 likewise installed protruding from a different location of the same respective inner wall to stop the door from swinging upwards as described above. The technology, assembly and mechanism of the flange valve 100 which mainly resides on the swinging door and the door stopper to prevent the entry of rodents and pests as described herein is the same or apply equally when the door 23 and the door stopper 34 directly attaches to the inner walls 42, 43, or 44 and therefore, will not be reiterated. Direct attachment of the door and the door stopper on a frame, the inner walls of the toilet flange, wax ring, bowl gasket, pipe and the like or embedding the flange valve or modifications of this within the wax ring, eliminates the need to supply the flange valve as a separate item or device. However, this will require a redesigning of the said frames. To use the existing commercially available toilet flange, wax ring, bowl gasket, pipe and the like, there is no option but to use the flange valve 100 as a separate device. Obviously, for new installations, one can have a choice between using devices having the incorporated flange valve technology or using the flange valve as a separate device and inserting this into the respective inner compartments of the toilet flange, wax ring, bowl gasket, pipe and the like. FIG. 12 shows the technology of the flange valve incorporated into a toilet flange 11 inserting into the pipe 13 and FIG. 13 shows the door and the door stopper attaching directly into a pipe 13. The structures on which the door and door stopper either attaches to or embedded within such as the different types of flange valve, the toilet flange, flanges in general, toilet bowl gasket, conduits such as the different pipes and structures or the wax rings are collectively referred to as frame.

While the embodiments of the present invention have been described, it should be understood that various changes, adaptations, and modifications may be made therein without departing from the spirit of the invention and the scope of the claims.

We claim:

1. A flange valve to deter entry of rodents and pests, insertable on existing devices, comprising a unidirectional, spring biased, swinging door attached on an inner wall of a cylindrical body having an inner central circular opening and a bottom lip, the door and the inner wall having a clearance between them of a dimension not allowing entry of rodents and pests, wherein said door includes a centrally located hole dimensioned to allow for the draining of a small amount of water or waste, and wherein the cylindrical body has a laterally protruding ring on a peripheral edge thereof, having openings on the protruding ring for the introduction of bolts or screws, wherein the door having a bottom surface that is recessed inwardly from the bottom lip of the cylindrical body to prevent pests from hooking or grabbing the door.

2. The flange valve of claim 1 further comprising stress grooves etched on the top surface of the door to facilitate breakage of the door into pieces.

3. The flange valve of claim 1 further comprising a plurality of restraining elements at the bottom surface of the door.

4. The flange valve of claim 1 wherein the cylindrical body is a cap having a flat top with a central opening and openings for the introduction of bolts and screws.

5. The flange valve of claim 1 wherein the door is attached by a hinge made of a rust proof material.

6. The flange valve of claim 1 wherein the frame is a wax free toilet bowl gasket, a toilet flange or a wax ring used in the installation of toilet bowls.

7. The flange valve of claim 1 further comprising gaskets for extra sealing between the devices.

8. The flange valve of claim 1 wherein a door stopper limits upward movement of the door in the circular opening.

9. The flange valve of claim 8 wherein the bottom surface of the door stopper matches the contour of the upper surface of the door.

\* \* \* \* \*